Sept. 17, 1935.	DU BOIS EASTMAN	2,014,724
MANUFACTURE OF OLEFINES
Filed March 20, 1934	3 Sheets-Sheet 1

INVENTOR
DU BOIS EASTMAN
BY R. J. Dearborn
HIS ATTORNEY

Sept. 17, 1935.  DU BOIS EASTMAN  2,014,724
MANUFACTURE OF OLEFINES
Filed March 20, 1934  3 Sheets-Sheet 3

Patented Sept. 17, 1935

2,014,724

UNITED STATES PATENT OFFICE 2,014,724

MANUFACTURE OF OLEFINES

Du Bois Eastman, Beacon, N. Y., assignor to The Texas Company, New York, N. Y., a corporation of Delaware Application March 20, 1934, Serial No. 716,445

4 Claims. (Cl. 260—170)

This invention relates to the manufacture of olefines and has to do particularly with the treatment of petroleum refinery gases and the like to prepare substantially pure olefines or products thereof.

In refinery operations, such as distilling, storage, transferring and treating, there are evolved large volumes of gases consisting mainly of olefines and paraffins the relative proportion of which depends on the source and degree of segregation of the various gases during the process of collection. The gases suitable for treatment, according to the present invention, may comprise the mixture of gases obtained by the ordinary refinery gas-collecting systems, preferably after the separation of the gasoline constituents and the removal of impurities, such as hydrogen sulfide, carbon dioxide and water therefrom. However, we may use gases composed largely of segregated portions of refinery gases; for example, those released from stills in which higher boiling hydrocarbons are converted into lower boiling products, such as gasoline, at high temperatures and pressures and in the liquid or vapor phase. The gases present are chiefly those of the methane and ethylene series, including methane, ethane, ethylene, propane and propylene, butanes and butylenes, etc.

The object of the present invention is to provide a simple and efficient means of separating the olefines already present and to produce and separate additional olefines from the paraffin hydrocarbons, higher than methane, which are contained in refinery gases and like materials to be treated. The products obtained from the process may be hydrogen and methane which are useful as fuel, and substantially pure olefines or mixtures of olefines, the components of each mixture having the same number of carbon atoms. The olefines so obtained are useful for the manufacture of solvents, special fuels, refrigerants and various organic chemicals.

It has been proposed heretofore to prepare olefines from mixed hydrocarbon gases, such as natural gas, by first separating the gas into the component paraffin hydrocarbons, such as ethane, propane and butane, separately cracking the substantially pure paraffins so obtained under optimum conditions for the production of olefines, then combining the resultant cracked products and finally separating the pure olefines from the mixture. Such a process involves two separations, the first in which the paraffins are separated from one another, and the second in which the olefines and paraffins are separated from each other and each from hydrogen and methane. Both separations are difficult but the latter is more so, particularly in that part of the separation which requires the isolation of the paraffins from olefines of the same number of carbon atoms.

In treating gaseous mixtures containing both olefines and paraffins, such as ordinary refinery gases, it is impractical and almost impossible to separate, by fractional distillation as has been done heretofore in the case of mixed paraffins, such as natural gas, pure paraffins as charging stocks to a cracking operation, since it is difficult to separate the paraffins from the olefines. Furthermore, it is highly undesirable to crack a mixture of olefines and paraffins inasmuch as the olefines are substantially destroyed under the temperature conditions prevailing during the cracking of the paraffins. I have now found that it is unnecessary to make a separation of substantially pure paraffins and that good results may be obtained in a simple and efficient manner by making a partial separation of the gases to produce a plurality of mixtures of two or more hydrocarbons which may be treated advantageously, according to the present invention. I have found, furthermore, that refinery gases and the like may be separated without difficulty into mixtures containing paraffins and olefines of the same number of carbon atoms and that, if such a separation is made, these mixtures may readily be treated to produce a high yield of substantially pure olefines.

In the fractionation of natural gas it is possible, without great trouble, to separate relatively pure paraffin hydrocarbons since the difference in the boiling points of the various constituents, such as methane, ethane, propane, butane, etc., are sufficiently great to permit separation by fractional distillation. I have found, however, that when at attempt is made to separate the olefines and paraffins of the same number of carbon atoms, such as the constituents of refinery gases, the desired separation is not obtained and great difficulty is encountered in the isolation of the paraffins from the olefines. When such a separation was attempted, it was found that the spread in the boiling points of the paraffin components of the mixture remains about the same as if the olefines were not present and that the boiling points of the olefines were also widely separated from each other but fell very close to the paraffins of the same number of carbon atoms. The separation of the olefines and paraffins of the same number of carbon atoms, therefore, is very difficult. I have discovered, however, that if no attempt is made to separate the olefines and paraffins of the same number of carbon atoms but instead only mixtures thereof are segregated, refinery gases may be separated into mixtures consisting of olefines and paraffins of the same number of carbon atoms with substantially the same facility as the natural gas may be separated into pure paraffins.

It is undesirable, as mentioned heretofore, to crack the mixtures of olefines and paraffins since the olefines are substantially destroyed in the cracking operation. I separate, therefore, the olefines from the mixtures of olefines and paraffins of the same number of carbon atoms and I obtain thereby not only substantially pure paraffins, which may subsequently be subjected to a cracking operation to convert them into more olefines, but also substantially pure olefines or products thereof. The separation of the olefines may be obtained by various methods which will be described more fully hereinafter. Polymerization or treatment with sulfuric acid whereby polymers or sulfonates are formed have been found satisfactory and preferably the sulfuric acid method.

In the conversion of the paraffins into olefines the optimum conditions for heat treating any particular paraffin may be obtained since only substantially pure materials are treated in a single operation. For a reaction time of about ¼ second the temperature conditions are about 1650° F. for ethane, 1575° F. for propane, and 1500° F. for butane. The optimum conditions for a particular apparatus may vary from those specified but it will be found in treating the paraffins that a decrement in temperature of about 50°–100° F. will be approximately correct as the homologous series is ascended. The cracking of the paraffins separately will obviously produce higher yields than if they were cracked together in a mixture since no set of conditions could be chosen for treating a mixture which would produce a yield of olefines as high as when treating the components separately under optimum conditions.

The principal products obtained by cracking the paraffins consist of olefines in mixture with hydrogen and other paraffins. In the case of ethane the principal reaction products are ethylene and hydrogen. For paraffins above ethane there is produced a mixture including some or all olefines having a less number of carbon atoms. By carefully controlling the operating conditions a yield of about 50% by volume of olefines in the cracked products may be obtained. The cracked products so obtained are then combined with the refinery gases charged to the system and the mixture treated as described. By varying the content of the paraffins added to the refinery gases, a charging stock of substantially constant ratio of paraffins to olefines may be secured.

As an illustration of the operation of the process, a refinery gas is first treated to remove the light gases, such as hydrogen and methane. If this initial operation is made by fractional distillation, the gases are compressed and then cooled to sufficiently low temperatures to effect substantially complete liquefaction. The liquids so produced are transferred to a series of fractionating columns in which the temperatures are adjusted to allow the methane and hydrogen to escape from the top of the first column, the ethylene and ethane from the second, the propane and propylene from the third, and the butane and butylene from the fourth. Under an operating pressure of about 200 lbs. per sq. in., for example, the temperature at the top of the first column would be about −100° F., at the top of the second column about −25° F., at the top of the third about +100° F. and at the top of the fourth about +200° F. In case the separation of the methane is done by absorptive rectification, an absorber is used in place of the first still and the fixed gases containing methane and hydrogen released from the top thereof. The remaining stills would be operated as stripping and rectification columns and similar operations conducted under substantially the same conditions as outlined above.

The methane and hydrogen fraction that is separated is preferably used as a fuel in the cracking furnaces to be described hereinafter. The other fractions are transferred separately to separating operations wherein the olefines are separated from the paraffins. According to one method of operation, the gases are scrubbed with acid, such as sulfuric acid, at suitable temperatures and proper concentrations to combine with and remove the olefines from the olefine-paraffin mixtures. In general, about 65°–66° Baumé acid for temperatures up to about 86° F. and atmospheric pressure gives good results. It has been found that 66° Baumé acid at about 86° F. is satisfactory for ethylene. If substantial super-atmospheric pressures are used weaker acids will function satisfactorily. The higher olefines usually require weaker acids and lower temperatures than those just given for treating ethylene. The reaction products consisting essentially of acid esters may be hydrolyzed to alcohol or treated otherwise as desired.

Another method for separation of the olefines is to subject mixtures containing olefines and paraffins of the same number of carbon atoms to separate polymerizing operations wherein the gases are subjected to a high pressure of the order of about 500 lbs., or above, and temperatures of about 700° F., or above, for sufficient time to effect substantially complete polymerization of the olefine content of the mixture. Working with ethylene, I have found 850° F. for about 30 min. to give good results. For propylene, slightly lower temperatures of about 800° F. are desirable while the higher olefines require correspondingly lower temperatures and about the same time. The products of polymerization are separated as liquids and may be used entirely or fractions thereof for the manufacture of motor fuel.

The unchanged paraffin components of the mixtures are conducted to separate heat treating or cracking furnaces wherein they are subjected to pyrolytic conditions of temperature and pressure suitable to yield maximum quantities of olefines. The optimum conditions for heat treating any particular paraffin will vary for a given apparatus and must be determined experimentally. Assuming, however, that the reaction time is ¼ second, a temperature of about 1650° F. will generally be found suitable for cracking ethane and for each succeeding higher member of the homologous series a temperature decrement of about 75° F. is desirable. By maintaining optimum conditions it is possible to obtain a yield of olefines approximately 50% of the charge. The mixtures of olefines and paraffins so produced are returned to the fractionation or absorption operation mentioned heretofore.

In practicing the invention, I may charge to the system a refinery gas of the following approximate composition:

| | Percent |
|---|---|
| Methane | 30 |
| Ethylene | 4 |
| Ethane | 25 |
| Propylene | 10 |
| Propane | 26 |
| Butanes | 2.5 |
| Butylenes | 2.5 |

The charge is mixed with the products recycled from the cracking furnace described above and the mixture treated by fractionation or absorption to remove the methane and hydrogen. The separated methane and hydrogen will comprise about 88% of the fresh charge or about 44% of the mixture of fresh charge and recycle stock. The higher hydrocarbons are separated into mixtures, consisting of olefines and paraffins of the same number of carbon atoms, including ethane and ethylene, equal to about 61% of the fresh charge or 30.5% of the mixture; propane and propylene, equal to about 45% of the fresh charge or 22.5% of the mixture; and butanes and butylenes, equal to about 12% of the charge or 6% of the mixture. The fractions so obtained are next treated to remove the olefines and to isolate substantially pure paraffins as explained heretofore.

The paraffins are then cracked in a suitable furnace under optimum conditions of pressure, temperature and time to produce a maximum yield of olefines as described heretofore. On the basis of 100 cu. ft. of gas the products and yields from the cracking operation would be about as follows:

| Product | Charge | | |
|---|---|---|---|
| | Ethane | Propane | Butanes |
| Methane and hydrogen | 26 | 26 | 6 |
| Ethylene | 10 | 16 | 3 |
| Ethane | 2 | 1 | 0 |
| Propylene | 1½ | 4 | 2 |
| Propane | 0 | 2 | 0 |
| Butylenes | 0 | 0 | 1 |

It will be observed from the above that the total methane and hydrogen produced is about 58% of the charge, ethylene about 29%, ethane 3%, propylene about 8%, propane 2% and butylene 1%. About 55% of the original charge is converted to olefines.

For purposes of further illustrating the invention reference will now be made to the accompanying drawings in which Figure 1 shows the boiling point curves of the principal paraffins and olefines of refinery gases.

Figure 1:
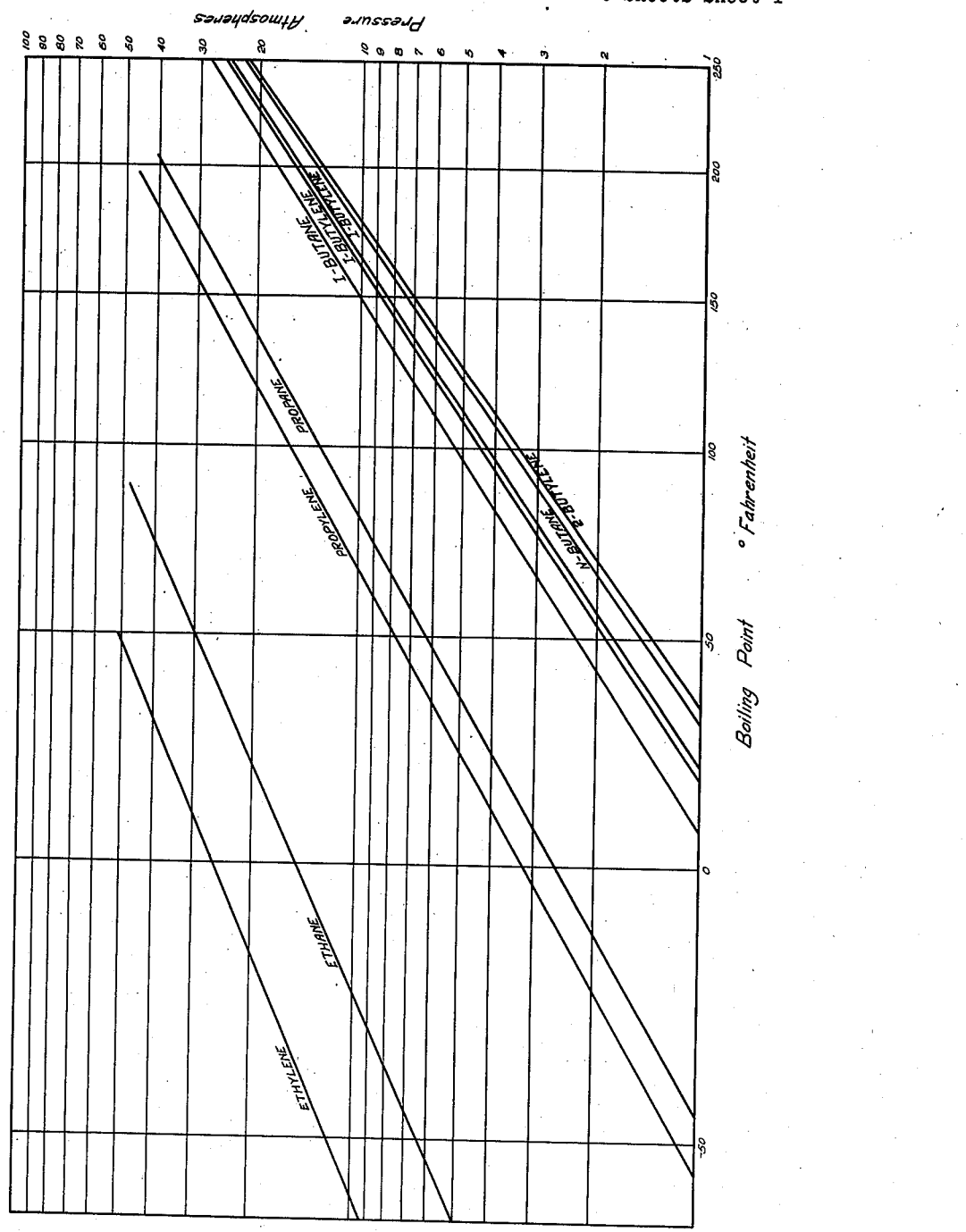

Referring to Figure 1, I have shown boiling point curves for several of the lower hydrocarbons. It will be noted that the curves show that olefine and paraffin hydrocarbons of the same number of carbon atoms fall quite close together but that there is a rather wide spread between any given hydrocarbon and the next hydrocarbon of the homologous series to which it belongs. Accordingly, the curves may be grouped together as follows:

1. Ethane and ethylene.
2. Propane and propylene.
3. Iso-butane, iso-butylene, 1-butylene, n-butane and 2-butylene.

These groups containing hydrocarbons of the same number of carbon atoms are relatively easy to separate from one another, but it is evident that it would be quite difficult to separate the individual members of each group. For example, it can readily be observed that it would be extremely difficult to separate the various butanes and butylenes.

Figure 2:
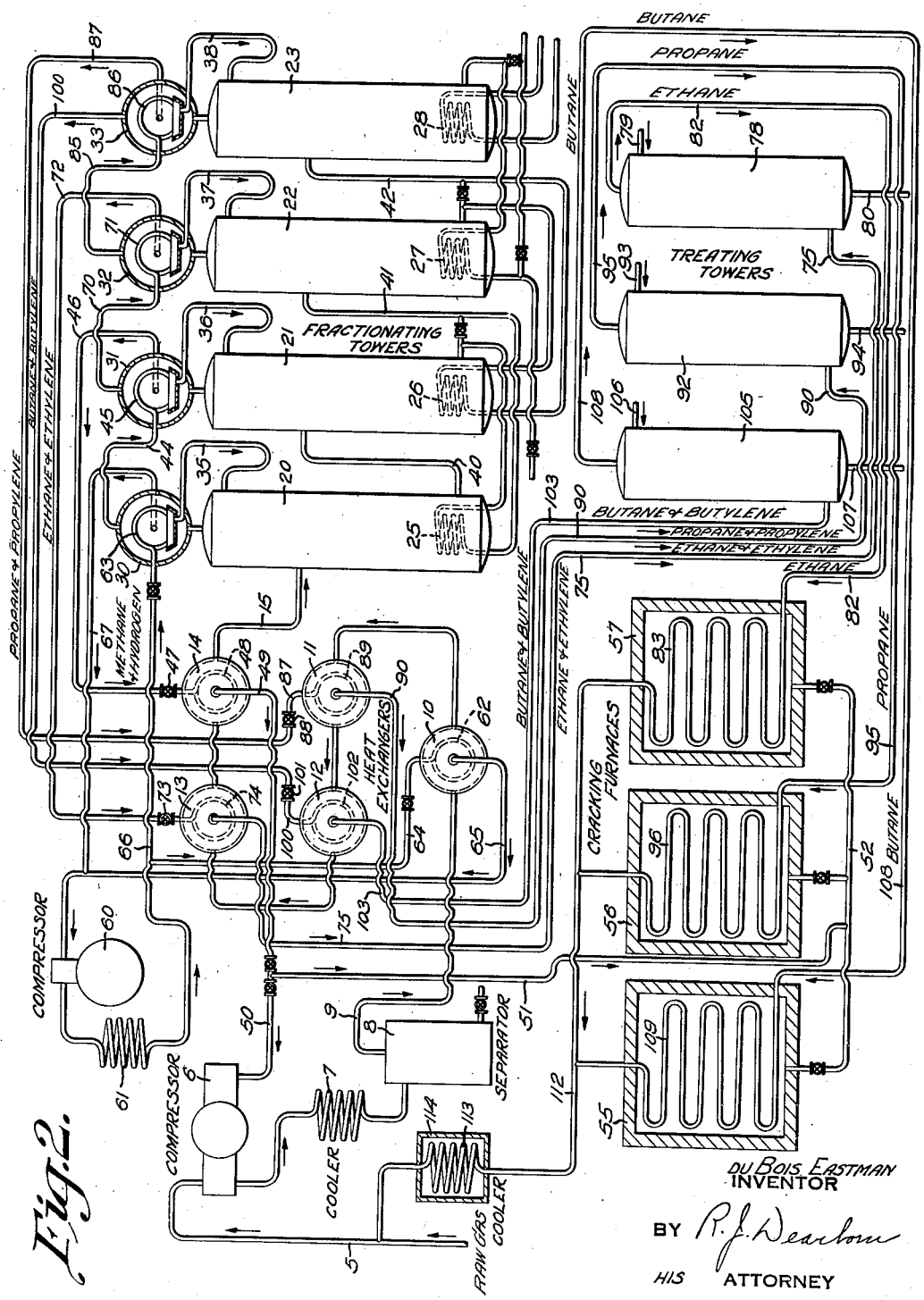
Figure 2 shows diagrammatically a complete apparatus for carrying the invention into practice.

Referring to Figure 2, the raw gas is drawn from a source of supply (not shown) such as a purification and gasoline recovery plant through line 5 to a compressor 6 wherein the gases are compressed under pressure of about 1000 lbs. per sq. in. or more. The compressed gases are then passed through a cooler 7, which is cooled by a suitable refrigerant such as ammonia, carbon dioxide, propane, etc. into a separator 8 wherein higher boiling constituents such as pentane, hexane, etc. are condensed and separated as liquids. The lower boiling materials, consisting largely of methane, ethane, ethylene, propane and propylene, butylene and butane, are conducted through the horizontal heat exchangers 10, 11, 12, 13 and 14 in which they are further cooled by heat exchange with cold vapors from the fractionating towers referred to hereinafter and discharged through line 15 into fractionating tower 20, the first of a series of towers 20, 21, 22 and 23. The fractionating towers are connected in series by pipes 40, 41 and 42, and each are equipped with reboiling coils 25, 26, 27 and 28, at the bottom, reflux condensers 30, 31, 32 and 33 at the top. Lines 35, 36, 37 and 38 are provided for returning reflux condensate from the reflux condensers to the towers. The reboiling coils 25, 26, 27 and 28 are attached to suitable connections whereby the bottoms from a succeeding tower may be circulated, all or in part, through a preceding tower. Thus a part or all of the liquids transferred from the tower 21 to tower 22 may be passed through coil 25. Likewise bottoms from the tower 22 may be circulated through coil 26 and bottoms from tower 23 through coil 27. The coil 28 and tower 23 may be supplied with an extraneous heating medium.

The bulk of the gases are condensed to liquids by the time they reach the tower 20. Conditions are maintained in the towers so that the hydrogen and methane are substantially entirely separated and withdrawn from the top of tower 20, ethane and ethylene from the top of tower 21, propane and propylene from the top of tower 22, and butane and butylene from the top of tower 23. The methane and hydrogen separated from tower 20 are conducted through line 44 to the heat exchange coil 45 in reflux condenser 31.

The gases are then passed through line 46, controlled by pressure release valve 47, to coil 48 in the heat exchanger 14. The gases are conducted from the heat exchanger 14, through the line 49. A part of the gas mixture may be passed through line 50 to the compressor wherein it is used as fuel. The remainder of the mixture is then passed through line 51 to the manifold 52 which distributes the gases for use as fuels in the furnaces 55, 56 and 57.

For the purpose of refrigerating the heat exchanger 10 and reflux condenser 30 there is provided a compression refrigerating system consisting of a compressor 60, cooling coil 61, and expansion coils 62 and 63. The expansion coils are located in the exchanger 10 and condenser 30, and are connected to the compressor and cooler by pipes 64, 65, 66 and 67. In the refrigerating system a suitable medium, such as propane or sulfur dioxide, may be used.

The gases separated in tower 21, consisting chiefly of ethane and ethylene, are withdrawn through the line 70 and passed through coil 71 located in the reflux condenser 32. The gases are then passed through line 72 controlled by valve 73 into the cooling coil 74 located in the exchanger 13. The gases are then conducted through pipe 75 to a tower 78 and contacted therein with sulfuric acid or a selective solvent, as the case may be, which is introduced through pipe 79. The acid or solvent selectively removes substantially all of the olefines from the paraffins and the mixture containing olefines and solvent or acid is withdrawn from the tower through a line 80. The paraffins, consisting essentially of ethane in this case, are withdrawn from the tower 78 through the line 82 and conducted to a cracking coil 83 in the furnace 57 wherein they are cracked under optimum temperature conditions to produce ethylene.

The gases from tower 22, consisting essentially of propane and propylene, are withdrawn through line 85, conducted through the cooling coil 86 located in the reflux condenser 33 and then passed through the line 87, controlled by valve 88, to the coil 89 in exchanger 11. From the exchanger, the gases are passed through pipe 90 to tower 92 wherein they are contacted with a reagent for removing olefines, introduced through pipe 93. The mixture containing the olefines is then withdrawn from the bottom of the tower 92 through the line 94. The paraffins, consisting essentially of propane are conducted from the top of tower 92, through pipe 95 to the cracking coil 96, located in furnace 56, wherein the gases are converted under optimum conditions to produce a maximum quantity of olefines.

The gases evolved from tower 23, consisting mainly of butane and butylenes, are conducted through line 100, controlled by valve 101, to cooling coil 102 located in the exchanger 12, and then through pipe 103 to the treating tower 105. In the tower 105 the gases are treated to remove the olefines with a suitable reagent introduced through line 106 and withdrawn through line 107. Paraffins from tower 105 are passed through pipe 108 to the cracking coil 109 located in furnace 55 wherein the materials are cracked to a high yield of olefines.

The cracked gases from the cracking coils 83, 96 and 109 are combined and conducted through line 112 to cooling coil 113 located in cooler 114. The cool gases are then combined with charging stock in line 5 and recirculated through the system.

Figure 3:
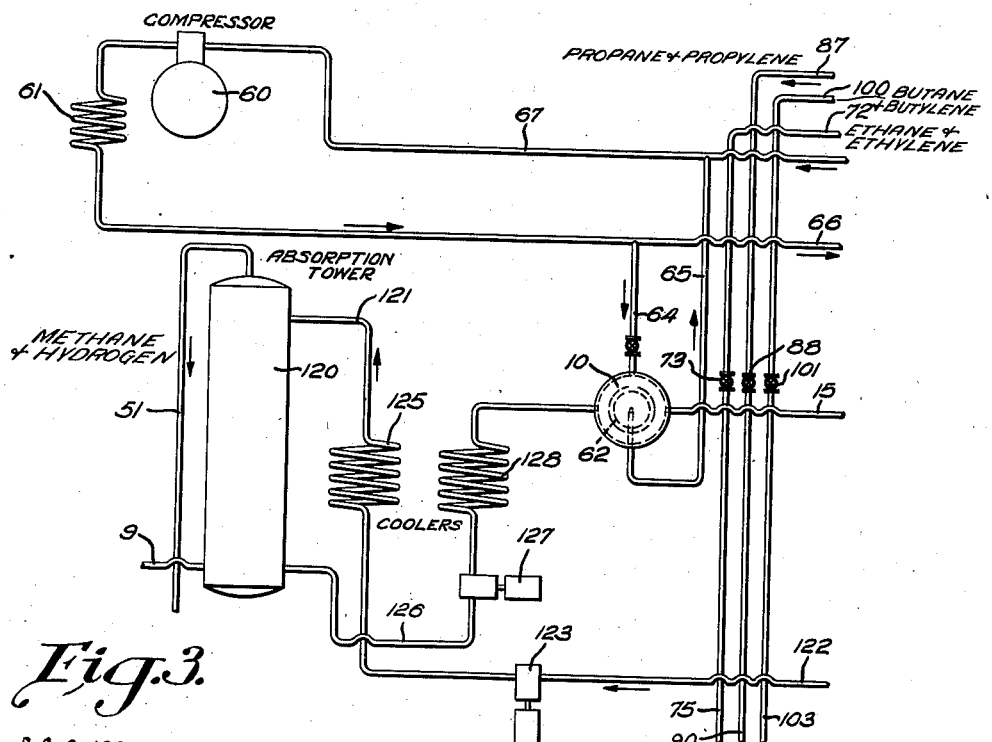
Figure 3 shows a modification of the apparatus shown in Figure 2 wherein the separation of the gases may be accomplished by absorptive rectification.

In Figure 3 I have shown a form of apparatus in which the gases to be treated are first absorbed in an absorption medium and fractionally distilled from the absorbent. In the modified form of apparatus the gases from separator 8 (Figure 2) are charged through line 9 to an absorption tower 120 in which they are passed countercurrent to and are scrubbed by an absorption medium introduced through the pipe 121. The absorption medium may be mineral seal, naphtha, or a light fraction, such as pentane or hexane, withdrawn from the bottom of tower 23 of Figure 2. The lean absorbent is charged through the line 122 by pump 123 and cooled in the cooling coil 125 if necessary prior to introduction into the tower 120. The unabsorbed gases, such as methane and hydrogen, are discharged from the top of the tower through the pipe 51 for use as fuel as described heretofore. The rich absorbent is withdrawn from the bottom of the tower 120 through line 126 and forced by pump 127 through a cooling coil 128. The cold oil is then conducted through heat exchanger 10 and pipe 15 into fractionating towers 20, 21, 22 and 23 wherein the gases are fractionally distilled to separate mixtures of olefines and paraffins of the same number of carbon atoms substantially as described in connection with the description of Figure 2. The fractions separated in the towers are conducted through lines 75, 90 and 103 directly to the treating towers, the exchangers 11, 12, 13 and 14 having been eliminated.

Figure 4:
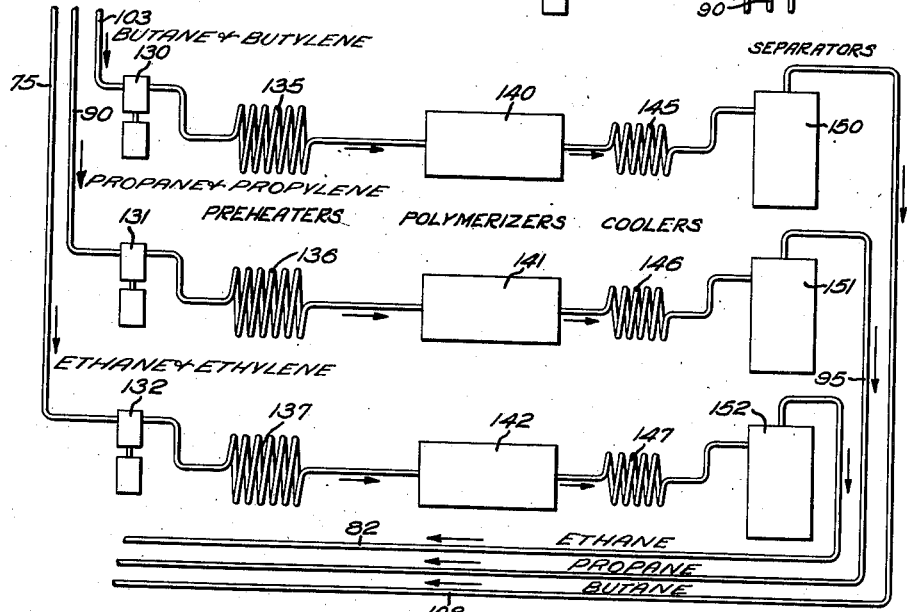
Figure 4 shows a modified form of apparatus for separating olefines from paraffins by polymerization.

In Figure 4 there is shown a modified form of apparatus which may be substitued for the treating towers 78, 92 and 105 of Figure 2. The modified form of apparatus provides a method of separating the olefines from the paraffins in the various fractions by polymerization of the olefines. By means of this apparatus fractions consisting of mixtures of olefines and paraffins of the same number of carbon atoms, such as ethane and ethylene, propane and propylene, butanes and butylenes from the lines 75, 90 and 103 respectively are separately compressed by compressors 130, 131 and 132 to pressures of the order of 500-3000 lbs. and then preheated to temperatures of about 600°-1000° F. in preheaters 135, 136 and 137. The preheated gases are passed to polymerizing chambers 140, 141 and 142 wherein sufficient time, usually within the range of 1-30 minutes, is provided for the olefines to polymerize. The products are cooled in coolers 145, 146, and 147 and passed to separators 150, 151 and 152 wherein the polymerized products are separated as liquids. The paraffins are then transferred through lines 82, 95 and 108 to the cracking coils, as described heretofore.

Obviously, many modifications and variations of the invention, as hereinbefore set forth, may be made without departing from the spirit and scope thereof, and therefore only such limitations should be imposed as are indicated in the appended claims.

I claim:

1. The method of treating petroleum refinery gases containing paraffin and olefine constituents which comprises separating from the hydrocarbons to be treated a mixture consisting essentially of paraffins and olefines having the same number of carbon atoms, treating the mixture to separate the olefines from the paraffins, heating the paraffins so separated under conditions favorable for the production of olefines therefrom, and combining the products from the heat treating process with the refinery gases charged to the separating operation.

2. The method of treating petroleum refinery gases containing a large proportion of paraffins and olefines heavier than methane which comprises separating the hydrocarbons into a plurality of mixtures consisting essentially of paraffin and olefine hydrocarbons of the same number of carbon atoms, separating the olefines from the paraffins in said mixtures, heat treating separately the paraffin mixtures so separated under optimum conditions for the production of olefines therefrom, and combining the products of the heat treating process with the refinery gases charged to the first mentioned separation operation.

3. The method of treating refinery hydrocarbon gases containing a large proportion of olefines and paraffins heavier than methane which comprises subjecting the charging stock to a separation operation in which the hydrocarbons of higher molecular weight than methane are separated into a plurality of fractions each of which consists essentially of paraffins and olefines of the same number of carbon atoms, isolating from the fractions so obtained the paraffins, heat treating each of the paraffin fractions under substantially the optimum conditions for the production of a maximum quantity of olefines therefrom, combining the products of the heat treatments and charging the same together with the refinery gases to said separation operation.

4. The method of treating refinery gases containing a large proportion of cracking still gases heavier than hydrogen and methane which comprises subjecting the gases to fractional separation in which the hydrogen and methane are first removed and then the hydrocarbons of higher molecular weight are separated into a plurality of mixtures consisting essentially of olefines and paraffins of the same number of carbon atoms, removing the olefines from each mixture and thereby isolating the paraffins, cracking the paraffin fractions so obtained in separate heat treating operations under substantially optimum conditions for the production of olefines therefrom, combining the products from the cracking operations and charging the same together with the refinery gases to said fractional separation operation.

DU BOIS EASTMAN.